US012145609B2

(12) United States Patent
Lutz et al.

(10) Patent No.: US 12,145,609 B2
(45) Date of Patent: Nov. 19, 2024

(54) METHOD FOR ANALYSING AN AUTOMATION SYSTEM OF AN INSTALLATION, EMULATOR FOR AT LEAST PARTIAL VIRTUAL OPERATION OF AN AUTOMATION SYSTEM OF AN INSTALLATION, AND SYSTEM FOR ANALYSING AN AUTOMATION SYSTEM OF AN INSTALLATION

(71) Applicant: AVL LIST GMBH, Graz (AT)

(72) Inventors: Sebastian Lutz, Speyer (DE); Rolf Hettel, Karlsruhe (DE); Albert Albers, Sinzheim (DE); Matthias Behrendt, Bruchsal-Obergrombach (DE); Christian Schyr, Heidelberg (DE)

(73) Assignee: AVL List GmbH, Graz (AT)

( * ) Notice: Subject to any disclaimer, the term of this patent is extended or adjusted under 35 U.S.C. 154(b) by 1186 days.

(21) Appl. No.: 16/956,400

(22) PCT Filed: Dec. 20, 2018

(86) PCT No.: PCT/AT2018/060313
§ 371 (c)(1),
(2) Date: Feb. 16, 2021

(87) PCT Pub. No.: WO2019/119012
PCT Pub. Date: Jun. 27, 2019

(65) Prior Publication Data
US 2021/0163029 A1 Jun. 3, 2021

(30) Foreign Application Priority Data
Dec. 21, 2017 (AT) .............................. A 51059/2017

(51) Int. Cl.
*B60W 50/06* (2006.01)
*B60W 30/095* (2012.01)
(Continued)

(52) U.S. Cl.
CPC ........ *B60W 50/06* (2013.01); *B60W 30/0956* (2013.01); *B60W 50/04* (2013.01);
(Continued)

(58) Field of Classification Search
CPC ............. B60W 30/0956; B60W 50/04; B60W 2420/52; B60W 2420/54; G01S 7/40; G01S 13/931
(Continued)

(56) References Cited

U.S. PATENT DOCUMENTS

| 10,727,582 B1* | 7/2020 | Crouch | H01Q 1/525 |
| 2005/0078835 A1* | 4/2005 | Baugh | G11B 25/043 361/679.33 |
| 2017/0109928 A1 | 4/2017 | Micks et al. | |

FOREIGN PATENT DOCUMENTS

| CN | 102890456 | 1/2013 |
| CN | 105652690 | 6/2016 |

(Continued)

OTHER PUBLICATIONS

English translation of DE 102014118625, Jun. 16, 2016. (Year: 2016).*

(Continued)

*Primary Examiner* — Michael P Nghiem
(74) *Attorney, Agent, or Firm* — Sheridan Ross P.C.

(57) ABSTRACT

The invention relates to a method for analysing an automation system, in particular a driver assistance system in a vehicle, an emulator for at least partial virtual operation of an automation system of an installation, and a system for analysing an automation system of an installation. An environment scenario for the installation, in particular a traffic scenario, is simulated. A response signal to be detected by at least one environment sensor, in particular an ultrasound response signal, is derived from the perspective of the at (Continued)

least one environment sensor on the basis of the simulated environment scenario. The response signal is output to the at least one environment sensor by means of an emulator, wherein the at least one environment sensor generates sensor data on the basis of the output response signal. In addition, the automation system and/or the installation are/is operated by means of the generated sensor data and preferably further sensor data of real and/or simulated sensors.

10 Claims, 8 Drawing Sheets

(51) Int. Cl.
    *B60W 50/04*     (2006.01)
    *B60W 60/00*     (2020.01)
    *G01S 7/40*     (2006.01)
    *G01S 13/931*     (2020.01)

(52) U.S. Cl.
    CPC ............. *B60W 60/001* (2020.02); *G01S 7/40* (2013.01); *G01S 13/931* (2013.01); *B60W 2420/408* (2024.01); *B60W 2420/54* (2013.01)

(58) Field of Classification Search
    USPC ........................................................ 702/116
    See application file for complete search history.

(56) References Cited

FOREIGN PATENT DOCUMENTS

| | | | |
|---|---|---|---|
| CN | 205608184 U | * | 9/2016 |
| DE | 10254388 | | 5/2004 |
| DE | 102007031040 | | 1/2009 |
| DE | 102008055932 | | 5/2010 |
| DE | 102009008680 | | 8/2010 |
| DE | 102014017831 | | 6/2016 |
| DE | 102014118320 | | 6/2016 |
| DE | 102014118624 | | 6/2016 |
| DE | 102014118624 A1 | * | 6/2016 |
| DE | 102014118625 | | 6/2016 |
| DE | 102014118625 A1 | * | 6/2016 |
| JP | 2008-145177 | | 6/2008 |
| JP | 2009-236628 | | 10/2009 |
| JP | 2015-520854 | | 7/2015 |
| KR | 10-1357596 | | 2/2014 |
| WO | WO 2017/069695 | | 4/2017 |

OTHER PUBLICATIONS

English translation of DE 102014118624, Jun. 16, 2016. (Year: 2016).*
English translation of CN 205608184, Sep. 28, 2016. (Year: 2016).*
Official Action with English Translation for Japan Patent Application No. 2020-534219, dated Oct. 24, 2022, 8 pages.
Official Action with English Translation for Korea Patent Application No. 10-2020-7021251, dated Jun. 13, 2023, 22 pages.
Official Action with English Translation for Japan Patent Application No. 2020-534219, dated Apr. 10, 2023, 14 pages.
Official Action for Austria Patent Application A 51059/2017, dated Aug. 30, 2018, 3 pages.
Translation of the International Search Report for International (PCT) Patent Application No. PCT/AT2018/060313, dated Mar. 27, 2019, 3 pages.
Official Action with English Translation for China Patent Application No. 201880081899.0, dated Jan. 19, 2022, 13 pages.

* cited by examiner

METHOD FOR ANALYSING AN AUTOMATION SYSTEM OF AN INSTALLATION, EMULATOR FOR AT LEAST PARTIAL VIRTUAL OPERATION OF AN AUTOMATION SYSTEM OF AN INSTALLATION, AND SYSTEM FOR ANALYSING AN AUTOMATION SYSTEM OF AN INSTALLATION

CROSS-REFERENCE TO RELATED APPLICATIONS

This application is a national stage application under 35 U.S.C. 371 and claims the benefit of PCT Application No. PCT/AT2018/060313 having an international filing date of 20 Dec. 2018, which designated the United States, which PCT application claimed the benefit of Austria Patent Application No. A51059/2017 filed 21 Dec. 2017, the disclosures of each of which are incorporated herein by reference in their entireties.

FIELD OF THE DISCLOSURE

The present invention relates to a method for analyzing an automation system, in particular a driver assistance system in a vehicle, an emulator for at least partial virtual operation of an automation system of an installation, and a system for analyzing an automation system of an installation.

BACKGROUND

Modern driver assistance systems (Advanced Driver Assistance Systems, ADAS) have since become widespread on the strength of the convenience and increased automotive safety they provide. The development of such systems is increasingly based on the so-called "from road to rig" approach, in which tests of driver assistance systems are not conducted in a real environment but rather in a simulated environment.

The "from road to rig" approach is for example realized in so-called "vehicle-in-the-loop" applications, in which a vehicle can be operated as if in a real environment, yet the interaction of the vehicle with its surroundings is created artificially and therefore in a controlled manner. For example, test benches are thus known in which physical objects are moved in front of vehicle sensors designed to measure distances in order to simulate different distances of the objects from the vehicle. It is thus possible to test the reactions of a driver assistance system to the various distances.

SUMMARY

A task of the invention is that of simplifying the connection of an automation system of an installation to a simulated test environment.

This task is solved by a method for analyzing an automation system, an emulator for at least partial virtual operation of an automation system of an installation, and a system for analyzing an automation system of an installation according to the independent claims.

A first aspect of the invention relates to a method for analyzing an automation system of an installation, in particular a driver assistance system of a vehicle, having environment sensors. The method comprises the following procedural steps: (i) simulating an environmental scenario for the installation, in particular a traffic scenario; (ii) deriving a response signal, in particular an ultrasonic response signal, to be detected by at least one environment sensor based on the environmental scenario from the perspective of the at least one environment sensor; (iii) outputting the response signal to the at least one environment sensor via an emulator, wherein the at least one environment sensor generates sensor data on the basis of the output response signal; and (iv) operating the automation system and/or the installation using the generated sensor data and preferably further sensor data of real and/or simulated sensors.

An emulator in the sense of the invention is in particular an apparatus configured to output information relative to a simulated environmental scenario to at least one environment sensor, for instance an ultrasonic sensor, in particular on the basis of setpoint signals and control parameters which characterize the simulated environmental scenario. The emulator thereby preferably transmits a response signal, for instance an ultrasonic response signal, which contains this information and can be received by the at least one environment sensor and converted into corresponding sensor data. In addition, the emulator can also be configured to receive a signal emitted by the at least one environment sensor and transmit the response signal as a function of the received signal, in particular as a function of the point in time at which the signal is received.

A simulated environmental scenario in the sense of the invention is in particular a model of the environment of the installation, in particular the vehicle, which provides information relative to the operation of the installation's automation system, particularly the driver assistance system. This information can thereby be essential to the operation of the automation system. A simulated environmental scenario can for example be a traffic situation of simulated vehicles moving on simulated roads or a parking space being formed between two stationary curbside vehicles. Such a simulated environmental scenario preferably provides information on the distances between the (virtual) objects of the simulated environmental scenario and/or at least one, potentially simulated, environment sensor of the installation. Alternatively or additionally, a simulated environ-mental scenario can also factor in a weather situation which impacts, in particular impairs, a (simulated) detection of the installation's environment, in particular of the vehicle, via simulated meteorological conditions such as humidity, air pressure and/or the like and/or via a simulated weather situation such as rain, snow, fog and/or the like.

An environment sensor in the sense of the invention is in particular an apparatus for detecting and/or measuring physical variables from the environment or respectively surroundings of the installation, in particular the vehicle. Preferably, the environment sensor is thereby configured to probe, in particular scan, the environment or respectively the surroundings of the installation. An environment sensor can for example be designed as an ultrasonic sensor, a radar sensor and/or a lidar sensor and can thereby be configured to emit sound waves or respectively electromagnetic waves and receive sound waves/electromagnetic waves influenced by the environment or surroundings respectively of the installation, in particular reflected on objects. Furthermore, the environment sensor is preferably configured to generate sensor data on the basis of a received response signal which characterizes the response signal and/or the information contained therein.

The invention is in particular based on the approach of operating an automation system of an installation, for instance a driver assistance system of a vehicle, at least in part on the basis of sensor data characterizing a simulated environmental scenario, in particular a simulated traffic situation. Preferably, response signals which contain information relating to the simulated environmental scenario are to that end provided at least at one environment sensor by an emulator. The at least one environment sensor can convert the response signals it receives into the corresponding sensor data. The response signals are thereby preferably derived from the simulated environmental scenario from the perspective of the at least one environment sensor, for instance by a provided signal being modulated as a function of the information relating to the simulated environmental scenario and/or being emitted from the emulator to the at least one environment sensor at a predetermined point in time, in particular after a time delay.

Based on the simulated traffic situation, for instance a parking space delimited by objects such as vehicles, road signs, buildings and/or curbs, response signals, e.g. ultrasonic response signals, can be generated and output by the emulator to at least one ultrasonic sensor. The ultrasonic response signals thereby preferably characterize at least the distance or distances of the vehicle, in particular the at least one ultrasonic sensor, from the objects delimiting the parking space. On the basis of the sensor data thereupon generated by the at least one ultrasonic sensor, the driver assistance system of the vehicle, for instance a parking assistant, can output instructions regarding the parking process to a driver of the vehicle and/or can park autonomously or at least partially autonomously.

This is particularly advantageous since the at least one environment sensor can thus be variably responsive without the actual environmental conditions needing to be changed. In particular, the automation system is able to depict substantially any environmental scenario on the basis of the response signal, in particular from the perspective of the at least one environment sensor. For example, an environmental scenario object can thereby be simulated in front of an ultrasonic sensor, the distance of which from the ultrasonic sensor can be regulated by a time-delayed response signal output by the emulator. For a driver assistance system which processes sensor data generated by the ultrasonic sensor, substantially any traffic situation can thus be depicted and its reaction to these traffic situations tested. The context in which the driver assistance system is tested is thereby irrelevant; i.e. the driver assistance system can be used both in the real environment, for instance on a road or test track respectively, as well as on a test bench, e.g. a roller-type dynamometer or powertrain test bench respectively.

As a whole, the invention enables a simplified connection of an installation's automation system to a simulated test environment.

In one preferential embodiment, the at least one environment sensor is simulated by means of a sensor model. The simulated environmental scenario is thereby virtually detected by the at least one simulated environment sensor and the response signal is preferably generated on the basis of the virtually detected simulated environmental scenario. In particular, the at least one environment sensor is thereby simulated by the sensor model in such a way that physical variables from the system's environment, for example distances to objects surrounding the vehicle, can be detected, in particular measured, in the simulated environmental scenario. As a result, the response signal characterizes the simulated environmental scenario in a particularly reliable and detailed manner. Doing so additionally simplifies the factoring in of the perspective of the at least one environment sensor relative to the simulated environmental scenario when deriving the response signal.

In a further preferential embodiment, a signal for virtually detecting the simulated environmental scenario, in particular its propagation and intensity, is simulated by the sensor model along with the response signal on the basis of physical models. Preferably, the sensor model is suited to mapping the at least one environment sensor within the simulated environmental scenario; i.e. simulating the at least one environment sensor or at least its function, in particular signal transmission, within the simulated environmental scenario. Particularly the reflection, scattering and absorption of the signal emitted by the at least one simulated environment sensor, for instance an ultrasonic signal, can be simulated on the basis of the physical models and a particularly accurate and realistic detection of the simulated environmental scenario thereby enabled.

In a further preferential embodiment, the automation system and/or the installation is/are operated on a test bench or in the field by means of the simulated environmental scenario. Preferably, the test bench is configured to stimulate further sensors in addition to the at least one environment sensor so that comprehensive information relative to the simulated environmental scenario as provided by the test bench is available for operating the automation system of the installation. For example, the test bench can be configured as a roller-type dynamometer, or powertrain test bench respectively, with which different road conditions or a vehicle's road traction can be emulated. Alternatively or additionally to an emulator for simulating ultrasound in the simulated environmental scenario, the test bench can also comprise a radar and/or lidar target emulator, an image stream emulator, a noise emulator and/or a weather emulator. By operating the vehicle on such a test bench or in the field, whereby the driver assistance system is operated using the simulated environmental scenario, the driver assistance system can on the one hand be comprehensively analyzed and, on the other hand, the interaction with further vehicle systems or components, for instance other driver assistance systems, the chassis and/or the engine control system, can be analyzed and tested. Integrating the simulated environmental scenario into the test bench or the field thereby provides the possibility of efficiently and safely performing the analysis, particularly without potentially damaging the installation.

In a further preferential embodiment, when outputting the response signal, the emulator takes into account a received signal which was emitted by the at least one environment sensor. In particular, the emulator thereby factors in the time at which the signal was received and outputs the response signal with a time delay. The emulator can thereby reliably and precisely map distances between an object of the modulated environmental scenario and the at least one environment sensor.

Preferably, the received signal is modulated to generate the response signal on the basis of the simulated environmental scenario so that one or more objects of the simulated environmental scenario are mapped by the response signal or, respectively, the response signal is characterized by the objects of the simulated environmental scenario. As a result, the response signal can contain particularly detailed information relative to the simulated environmental scenario, thereby enabling a particularly reliable and comprehensive analysis of the automation system of the installation.

A second aspect of the invention relates to an emulator for at least partial virtual operation of an automation system of an installation, in particular a driver assistance system of a vehicle, which has environment sensors. The emulator preferably comprises a receiver configured to receive signals emitted by an environment sensor as well as a transmitter configured to transmit response signals to received signals. In addition, the emulator preferably comprises an absorptive region configured to absorb (unwanted) signals reflected by the emulator itself. The emulator is preferably configured to be positioned on or in front of an environment sensor and to shield the environment sensor from signals not emitted to the environment sensor by the transmitter. As a result, the sensor data generated by the environment sensor on the basis of the received response signal is substantially solely characterized by the simulated environmental scenario such that the automation system can be reliably operated virtually, at least in part.

The emulator can for instance be at least partially coated with a material suited to absorbing the signals emitted by the environment sensor, in particular in the area of the receiver and/or the transmitter, so that signals emitted by the environment sensor which do not directly strike the receiver are absorbed. Preferably, the material is designed as an acoustic absorber, in particular as a sound-absorbing foam mat, and suited to absorbing ultrasonic signals emitted by the environment sensor.

In one preferential embodiment, the emulator further comprises a signal processing device configured to generate response signals on the basis of the received signals. Alternatively or additionally, the emulator comprises a data interface for receiving setpoint signals and/or control parameters, in particular in real time, from a central control. The emulator can thereby be reliably operated and controlled, in particular the generation of the response signals can be influenced as needed.

The signal processing device is thereby preferably configured to modulate and/or delay or respectively output the received signals to the transmitter with a time delay based on the simulated environmental scenario, in particular on the basis of the received setpoint signals and/or control parameters. The signal processing device can for example be configured as a correspondingly programmed microcontroller. A precise mapping of the simulated environmental scenario is thus enabled by means of the response signals.

The data interface is preferably designed as a D-sub connector and for example configured to receive the setpoint signals and/or control parameters from the central control via a data bus, in particular an I²C bus. The central control can be a microcontroller which is configured, in particular programmed, to receive simulation data relative to the simulated environmental scenario from a simulation means for simulating the environmental scenario, e.g. over a network connection using the UDP protocol, and to generate the setpoint signals and/or control parameters on the basis of the received simulation data and output them to the data interface. Information relating to the simulated environmental scenario can thus be reliably and flexibly provided on the emulator.

In a further preferential embodiment, the receiver and the transmitter are arranged in a signal-absorbing chamber. Preferably, the signal-absorbing chamber forms the absorptive region of the emulator. For example, the signal-absorbing chamber is at least partially lined with the material suited to absorbing the signals emitted by the environment sensor. The receiver and/or the transmitter of the emulator is/are thereby preferentially arranged in a recess of the signal-absorbing chamber so that the signals emitted by the environment sensor, which in addition to the receiver also strike the signal-absorbing chamber, particularly the signal-absorbing material, are not reflected and thus do not interfere with the response signals emitted by the transmitter.

In a further preferential embodiment, the signal-absorbing chamber comprises an opening through which the signals can enter the emulator and/or in which or in front of which an environment sensor can be arranged. The receiver and/or the transmitter of the emulator is/are thereby preferably arranged on an opposite side of the signal-absorbing chamber from the opening. So doing can reliably prevent an unwanted reflection of the signals emitted by the environment sensor and/or interference in the response signals emitted by the transmitter; i.e. enable an effective shielding of the environment sensor and the transmitter and/or receiver from the installation's surroundings.

A third aspect of the invention relates to a system for analyzing an automation system of an installation, in particular a driver assistance system of a vehicle, having environment sensors. The system comprises a simulation means for simulating an environmental scenario for the installation and at least one emulator, in particular an ultrasound emulator, preferably in accordance with the second aspect of the invention. The at least one emulator is thereby configured to output a signal to the environment sensors based on the environmental scenario from the perspective of the environment sensors.

In a further embodiment, the system further comprises a central control. Preferably, the central control and the at least one emulator are configured to communicate with one another, in particular via the data interface. Further preferably, the central control is configured to control an output of response signals at a plurality of emulators on the basis of the environmental scenario. A plurality of, in particular spatially separated, environment sensors can thereby each be stimulated by one emulator; i.e. response signals adapted to the position of the respective environment sensor in relation to the simulated environmental scenario are provided at each environment sensor, which enables a particularly comprehensive analysis of the automation system.

The central control is thereby in particular configured to generate corresponding setpoint signals and/or control parameters from the simulation data provided by the simulation means for simulating the environmental scenario, for example via a network connection using the UDP protocol, and to coordinate the provision of same at the data interface of the at least one emulator. The simulation data can thus be used in particularly versatile manner in the analyzing of the automation system.

In a further preferential embodiment, the central control defines the frequency, amplitude and response reaction time for each of the plurality of emulators. As a result, the simulated environmental scenario can be mapped in particularly realistic and detailed manner by each of the response signals from the plurality of emulators.

The features and advantages described with respect to the first aspect of the invention and advantageous embodiment thereof also apply, at least where technically reasonable, to the second and third aspects of the invention and advantageous embodiment thereof and vice versa.

BRIEF DESCRIPTION OF THE FIGURES

Further features, advantages and possible applications of the invention will become apparent from the following description in conjunction with the figures, in which the same reference numerals are used throughout for the same or corresponding elements of the invention. Shown therein at least partially schematically.

DETAILED DESCRIPTION

Figure 1:
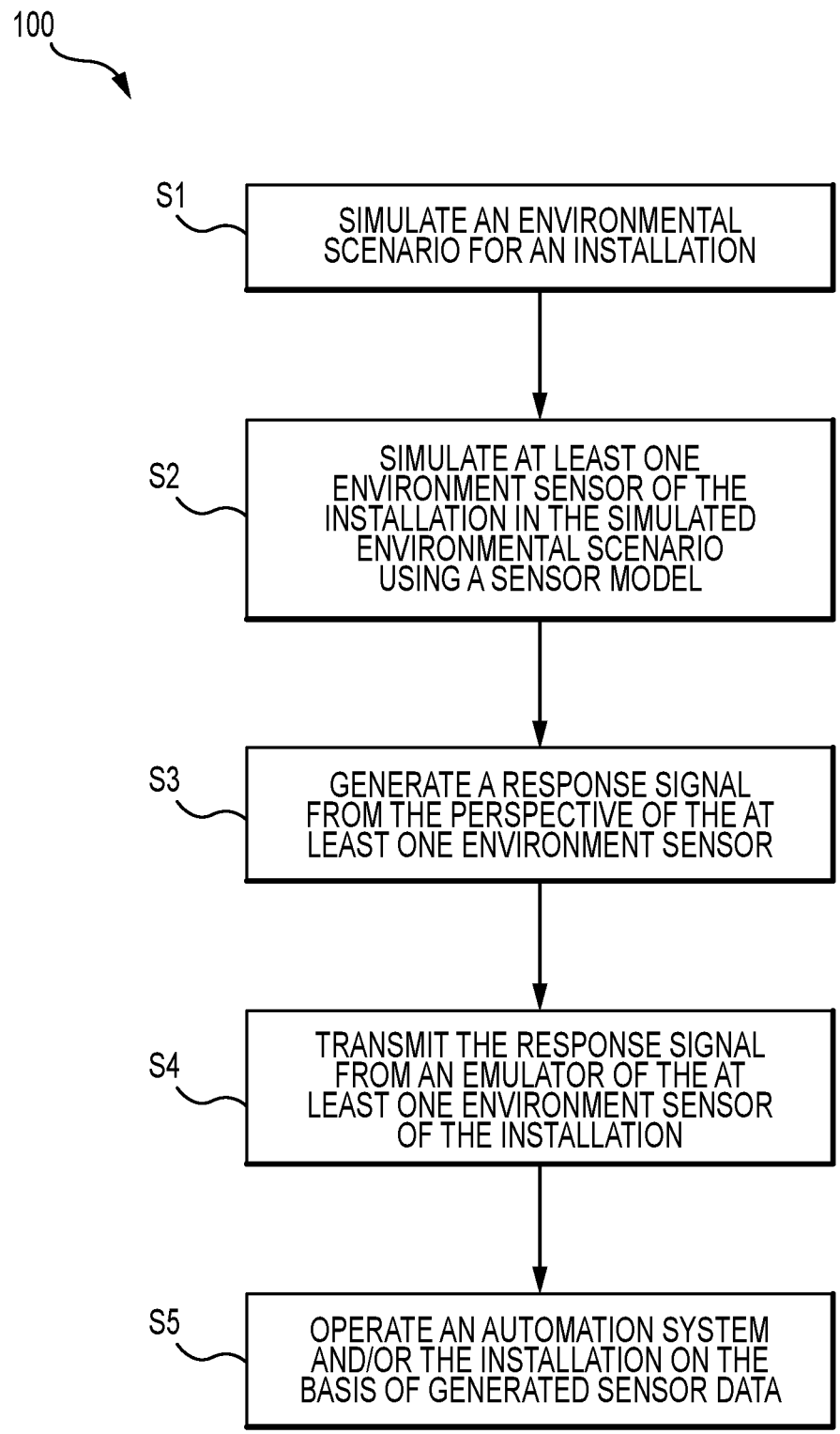
FIG. 1 a preferential exemplary embodiment of a method according to the invention.

FIG. 1 shows a preferential exemplary embodiment of a method 100 according to the invention for analyzing an automation system of an installation, in particular a driver assistance system of a vehicle.

In method step S1, an environmental scenario, particularly a traffic scenario, is simulated for the installation. This is preferably effected using a suitable software, e.g. AVL VSM® or Vires VTD®. As a result, simulation data which characterizes the environmental scenario can be generated; i.e. containing for example information regarding the type of the various objects in the simulated environmental scenario, the physical properties of the objects, the distances between the objects, the weather conditions, road conditions and/or the like.

In a further method step S2, preferably at least one environment sensor of the installation, for example an ultrasonic sensor of the vehicle, is simulated in the simulated environmental scenario using a sensor model. The sensor model can contain physical models, on the basis of which interaction between the simulated environment sensor and the objects of the simulated environmental scenario can be derived. Able to thereby be simulated is for example a signal emitted by the simulated environment sensor in the simulated environmental scenario, in particular its propagation and intensity. In particular determined are the reflection, transmission and absorption of the simulated signal on objects in the simulated environmental scenario.

In a further method step S3, a response signal is generated from the perspective of the at least one environment sensor, preferably on the basis of the simulated environmental scenario, in particular on the basis of the simulated environment sensor in the simulated environmental scenario and/or the simulated interaction of the simulated signal emitted by the simulated environment sensor for detecting the simulated environmental scenario. The response signal preferentially contains information relevant to the operation of the automation system as regards the simulated environmental scenario. The response signal can be generated for example by modulating and/or delaying a provided signal based on the simulated interaction between the signal emitted by the simulated environment sensor and the simulated environmental scenario.

In a further method step S4, the response signal is transmitted from an emulator to the at least one environment sensor of the installation, for instance sonic waves are emitted to the at least one environment sensor designed as an ultrasonic sensor via an emulator transmitter. Sensor data characterizing the simulated environmental scenario can thus be generated by the at least one environment sensor on the basis of the response signal.

In a further method step S5, the automation system and/or the installation is operated on the basis of the generated sensor data. In addition, further sensor data of real and/or simulated sensors can be generated and used to operate the automation system and/or the installation.

Figure 2:
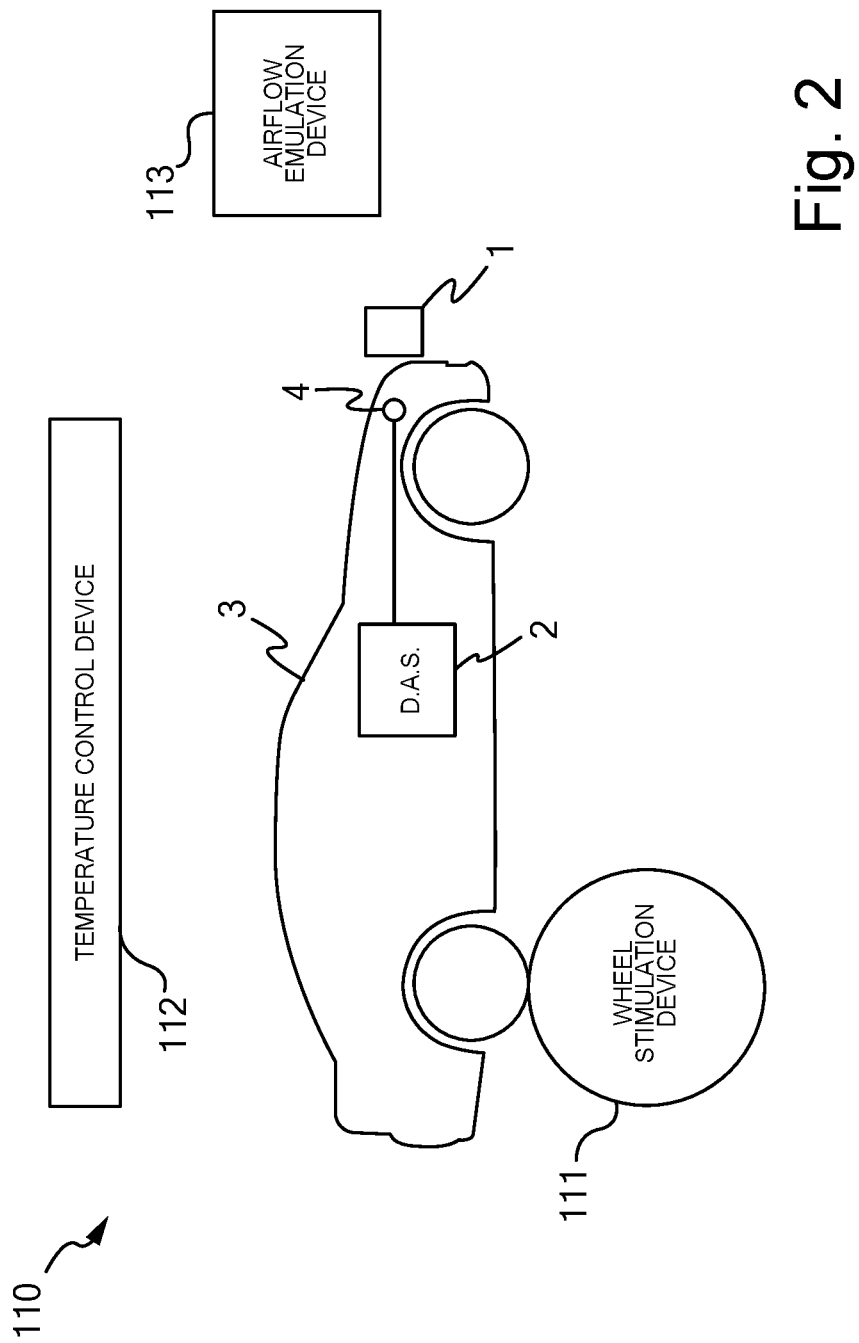
FIG. 2 a test bench with an emulator according to the invention.

FIG. 2 shows a test bench 110 having an inventive emulator 1 for at least partial virtual operation of an automation system of an installation, in particular a driver assistance system 2 ("D.A.S. 2") of a vehicle 3. The test bench 110 is preferably a roller-type dynamometer having a wheel stimulation device 111 and a weather emulator which comprises a temperature control device 112 and an airflow emulation device 113.

The vehicle 3 can be operated under precisely controlled conditions by means of the test bench 110. For example, torque can be applied to the rotatably mounted wheel stimulation device 111, whereby different loads on the vehicle 3, different road conditions and/or the like can be simulated. Alternatively or additionally, various weather conditions can be simulated, for instance by the temperature control device 112 providing different temperatures and/or the airflow emulation device 113 providing different wind flows.

Further, particularly more complex interactions of the vehicle 3 with its surroundings and/or influences of the surroundings on the vehicle 3 can be simulated by the emulator 1, which is preferably designed as an ultrasound emulator.

In order to detect the surroundings, the vehicle 3 has at least one environment sensor 4 configured to transmit a signal for detecting the surroundings of the vehicle 3. The signal, for example an ultrasonic signal, interacts with the environment and is thereby influenced by the environment. The influenced signal can be received by the at least one environment sensor 4 and sensor data which characterizes the environment of the vehicle 3 generated on the basis thereof. The interaction thereby corresponds for example to a reflection, a transmission and/or an at least partial absorption of the signal on or respectively by objects from the surroundings of the vehicle 3.

In order to be able to analyze the driver assistance system 2 in a precisely controlled environment, the emulator 1 is preferably configured to stimulate the at least one environment sensor 4 of the vehicle 3 according to a simulated environmental scenario, for example a traffic situation. To that end, the emulator 1 preferentially transmits a response signal derived from the simulated environmental scenario from the perspective of the at least one environment sensor 4 and advantageously based on the signal previously emitted by the at least one environment sensor 4 and received by the emulator 1. The response signal received by the at least one environment sensor 4 thus corresponds to a signal influenced by interaction with the environment.

The response signal thus contains information regarding the simulated environmental scenario, for example regarding the physical properties of objects in the simulated environmental scenario. In particular, the at least one environment sensor 4 can conclude the distances of said at least one environment sensor 4 to objects in the simulated environmental scenario based on a time delay between the transmitting of the signal and the receiving of the response signal. In order to emulate distances predetermined by the simulated environmental scenario, the emulator 1 can be configured to correspondingly delay the response signal transmission in relation to the previous reception of the signal.

FIG. 3 shows a housing 5 of an inventive emulator 1. Due to its substantially rectangular, particularly cube-like, shape, the housing 5 can be easily arranged in the region of an installation, in particular integrated into a test bench (see FIG. 2).

Figure 3A:
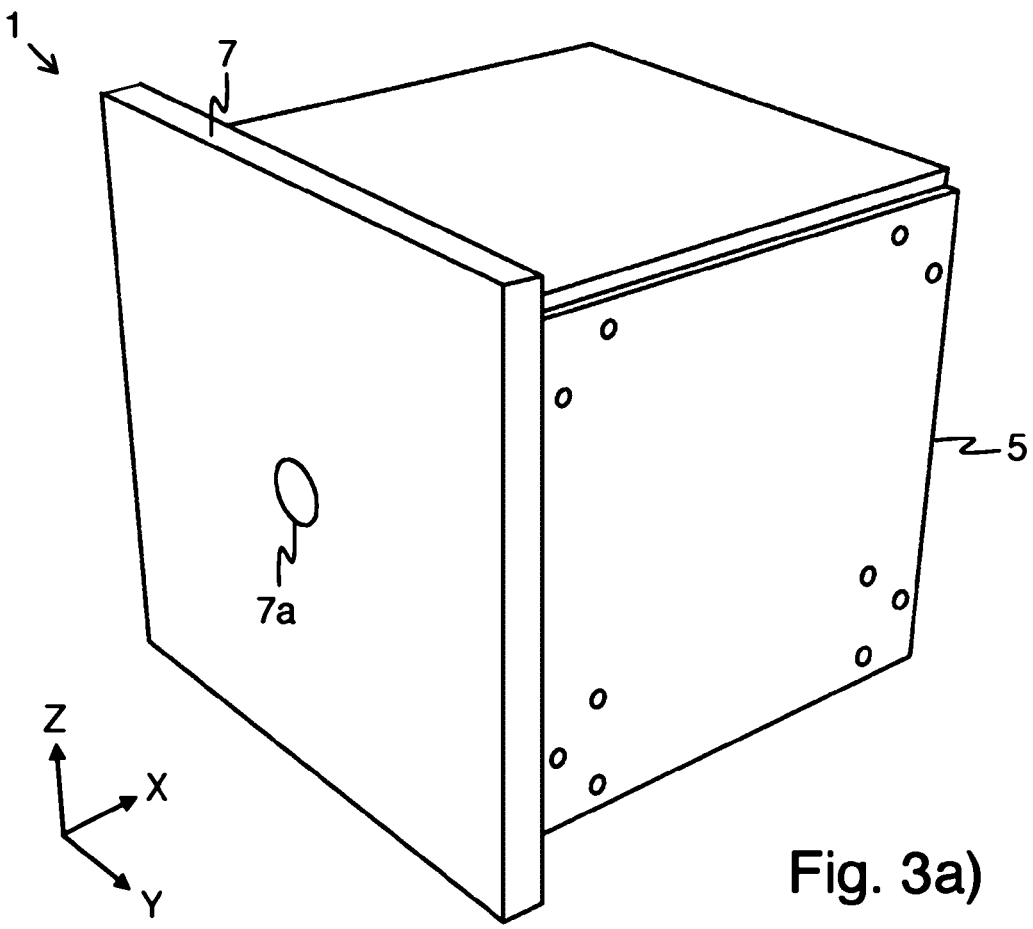
FIG. 3 a housing of an emulator according to the invention.

In the exemplary embodiment shown, one external side of the housing 5 which faces an environment sensor of the installation, for example an ultrasonic sensor of a vehicle, is covered with a signal-absorbing panel 7, as is clearly seen in the three-dimensional depiction of the emulator 1 in FIG. 3a). The signal-absorbing panel 7 thereby has a panel opening 7a through which can enter the signals emitted by the environment sensor for detecting an environment and/or a scenario in the environment of the installation and/or response signals generated by the emulator 1 in reaction to the signals, in particular can enter into or out of the emulator 1. Preferably, the panel opening 7a is thereby positioned directly in front of the environment sensor.

The signal-absorbing panel 7 is in particular designed as an ultrasound-absorbing foam panel and configured to absorb signals emitted by the environment sensor which do not enter the emulator 1 because of for example being emitted at an inappropriate angle. This thereby makes it possible to prevent such signals, or at least reduce the reflection of such signals which could interfere with the response signals, on the emulator 1.

Figure 3B:
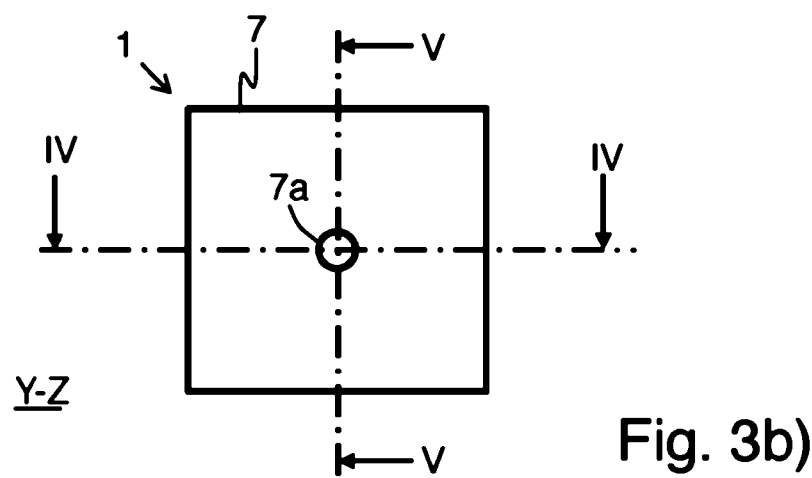

The following FIGS. 4 to 7 each depict a section through the emulator 1 in the X-Y, X-Z, Y-Z planes defined by the coordinate system shown in FIG. 3a). FIG. 3b) depicts the correspondent line of intersection IV-IV, which runs in the X-Y plane, and correspondent line of intersection V-V, which runs in the X-Z plane, in a frontal view; i.e. in the Z-Y plane of the emulator 1.

Figure 4:
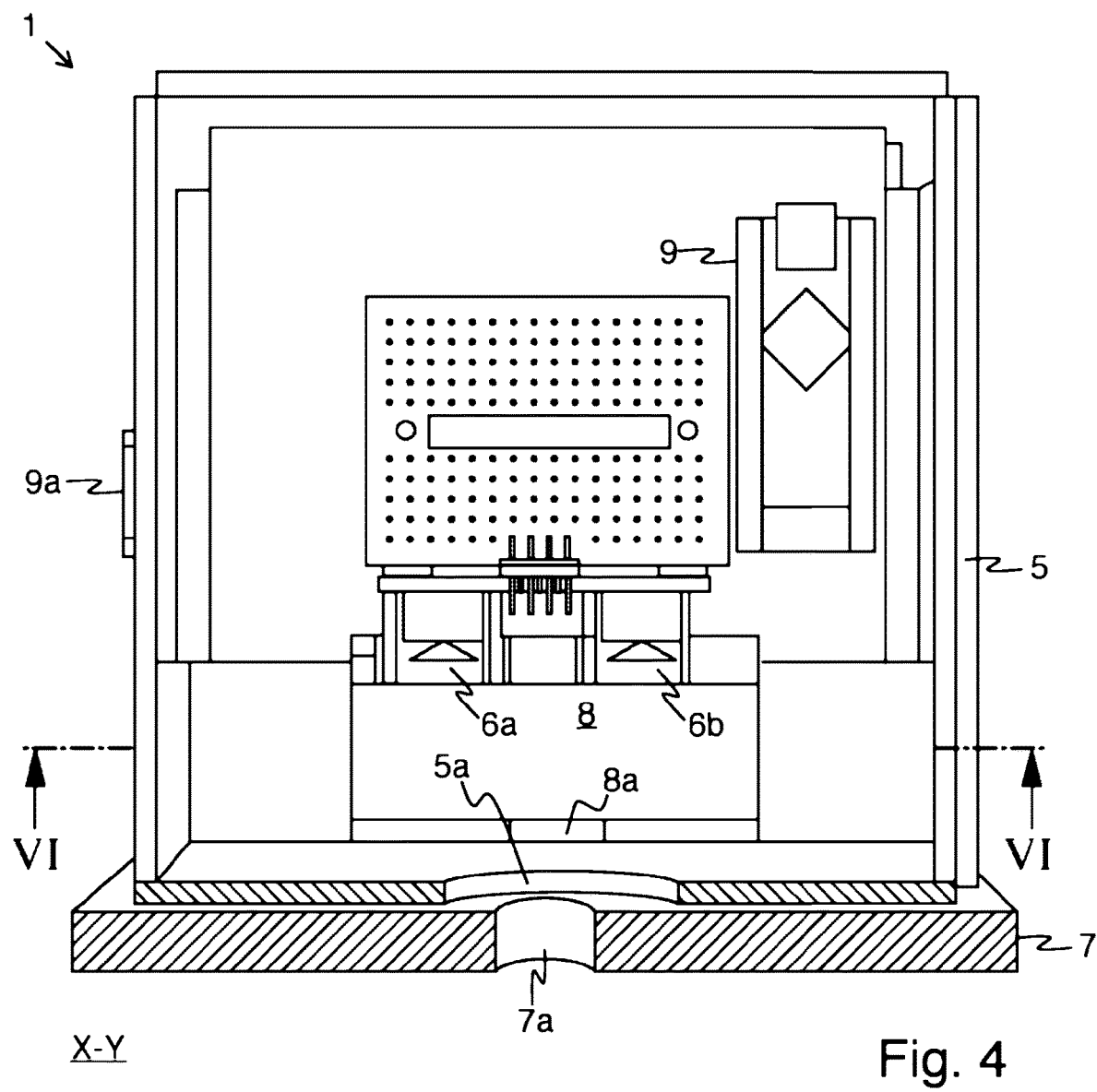
FIG. 4 a sectional view through the emulator from FIG. 3 along the IV-IV intersecting line.

FIG. 4 shows a section through the inventive emulator 1 along the IV-IV intersecting line in the X-Y plane according to FIG. 3b). The emulator 1 exhibits a housing 5 in which a receiver 6a, a transmitter 6b, a signal-absorbing chamber 8 and a signal processing device 9 are arranged.

The receiver 6a is preferably configured to receive a signal, in particular an ultrasonic signal for detecting the environment and/or a scenario in the environment of the installation emitted by at least one environment sensor of an installation, in particular an ultrasonic sensor of a vehicle (see FIG. 2). The receiver 6a can for instance be designed as an ultrasound receiver and suited to operating in the frequency range used by the at least one ultrasonic sensor of the vehicle.

The transmitter 6b is preferably configured to return a response signal characterizing a simulated environmental scenario to the at least one environment sensor. The transmitter 6b can thereby for instance be designed as an ultrasound transmitter and suited to operating in the frequency range used by the at least one ultrasonic sensor of the vehicle.

The response signal is thereby preferably generated by the signal processing device 9 on the basis of the signal received by the receiver 6a and the simulated environmental scenario from the perspective of the environment sensor, for example by modulating and/or delaying the received signal. To that end, the signal processing device 9 is for example designed as a microcontroller having at least one memory which incorporates a computer program for the corresponding signal processing.

Figure 8:
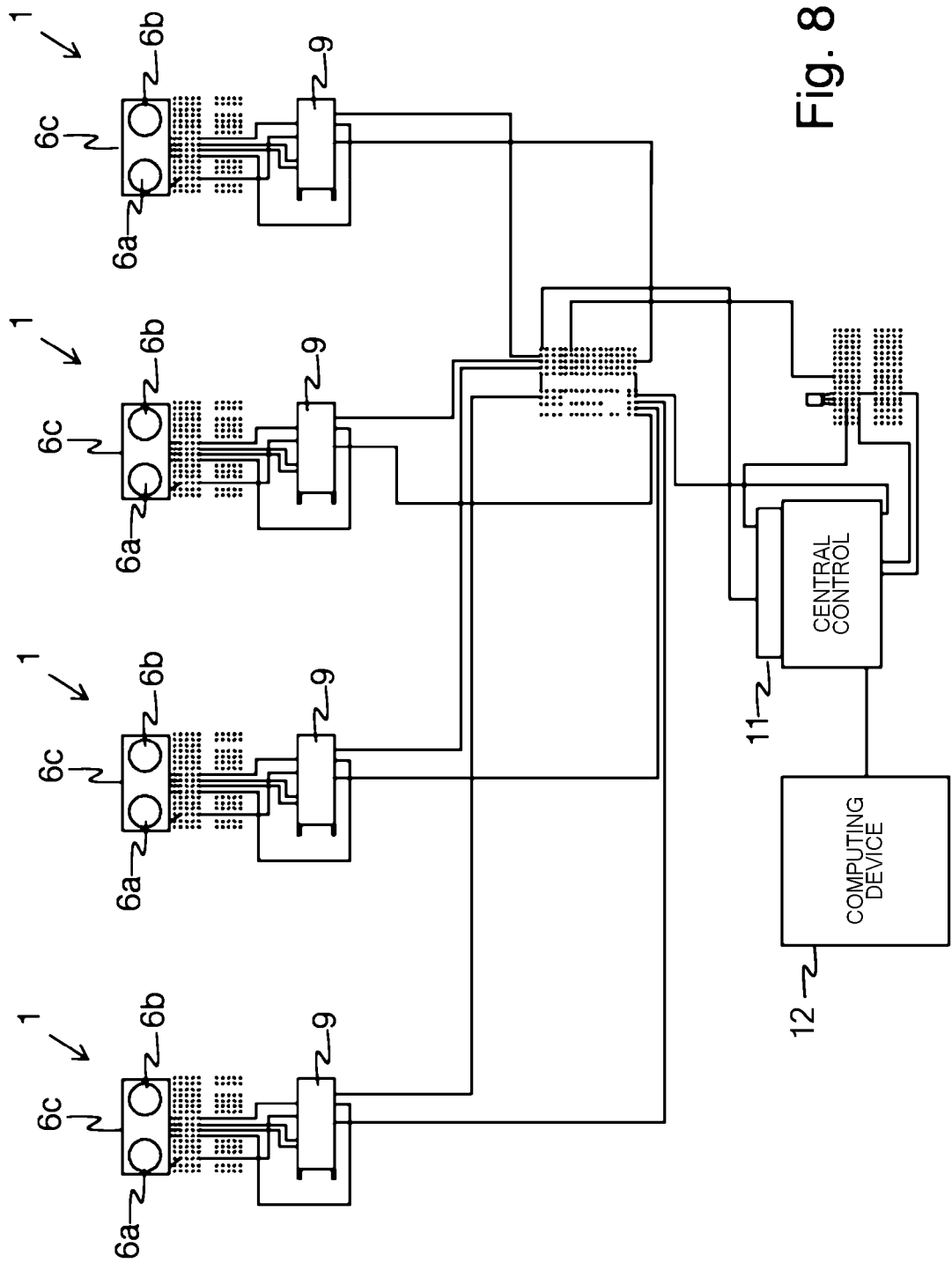
FIG. 8 a preferential exemplary embodiment of a system according to the invention.

The signal processing device 9 generates the response signal, in particular factoring in setpoint signals and/or control parameters able to be received via a data interface 9a and generated by a central control (see FIG. 8). The setpoint signals and/or control parameters thereby preferably allow the signal processing device 9 to control the transmitter 6b in a manner so as to generate a response signal emulating a signal emitted by the at least one environment sensor which has interacted with objects of the simulated environmental scenario. In so doing, the response signal as generated represents the simulated environmental scenario.

The receiver 6a and transmitter 6b are preferentially arranged within the signal-absorbing chamber 8 which is lined with a signal-absorbing material 8b and forms an absorptive region. The signal-absorbing chamber 8 is in particular designed as a cavity defining the absorptive region. Signals emitted by the at least one environment sensor can thereby be reliably prevented from reflecting on the emulator 1, in particular back to the at least one environment sensor, and thereby interfering with the response signal.

The signal-absorbing chamber 8 exhibits an opening 8a through which the signal and/or the response signal can be transmitted. The opening 8a is thereby arranged concentric with a housing opening 5a and advantageously on a side of the signal-absorbing chamber 8 opposite the receiver 6a and transmitter 6b so that the signal and/or the response signal can spread or propagate in substantially straight and undisturbed manner between the at least one environment sensor arranged in front of the emulator 1, in particular in front of the signal-absorbing chamber 8, and the receiver 6a or transmitter 6b respectively. The housing 5 is covered with a signal-absorbing panel 7, in particular an ultrasound-absorbing foam panel, on an external side adjacent the signal-absorbing chamber 8 on which the housing opening 5a is also arranged. The panel 9 likewise has a panel opening 7a arranged concentric with both the opening 8a as well as the housing opening 5a.

Figure 5:
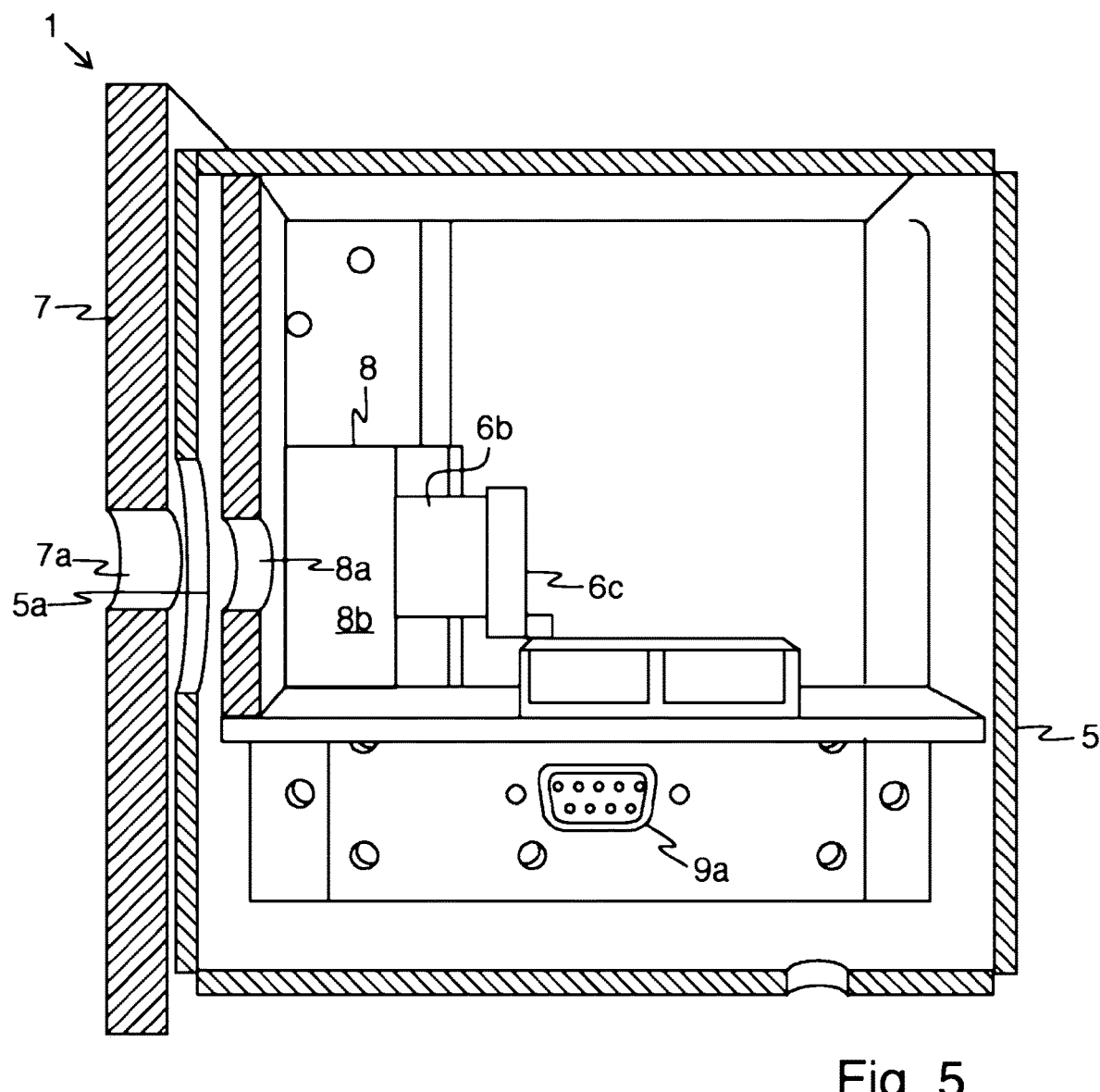
FIG. 5 a sectional view through the emulator from FIG. 3 along the V-V intersecting line.

FIG. 5 shows a section through the inventive emulator 1 along the V-V intersecting line in the X-Z plane according to FIG. 3b). The transmitter 6b, which is disposed opposite from the mutually concentric openings 8a, 5a, 7a of the signal-absorbing chamber 8, the housing 5 of the emulator 1 or the signal-absorbing panel 7 respectively, can thereby be controlled by means of the signal processing device (see FIG. 4) via a transceiver board 6c. Preferably, the receiver (see FIG. 4) can likewise be controlled by the signal processing device via the transceiver board 6c.

Figure 6:
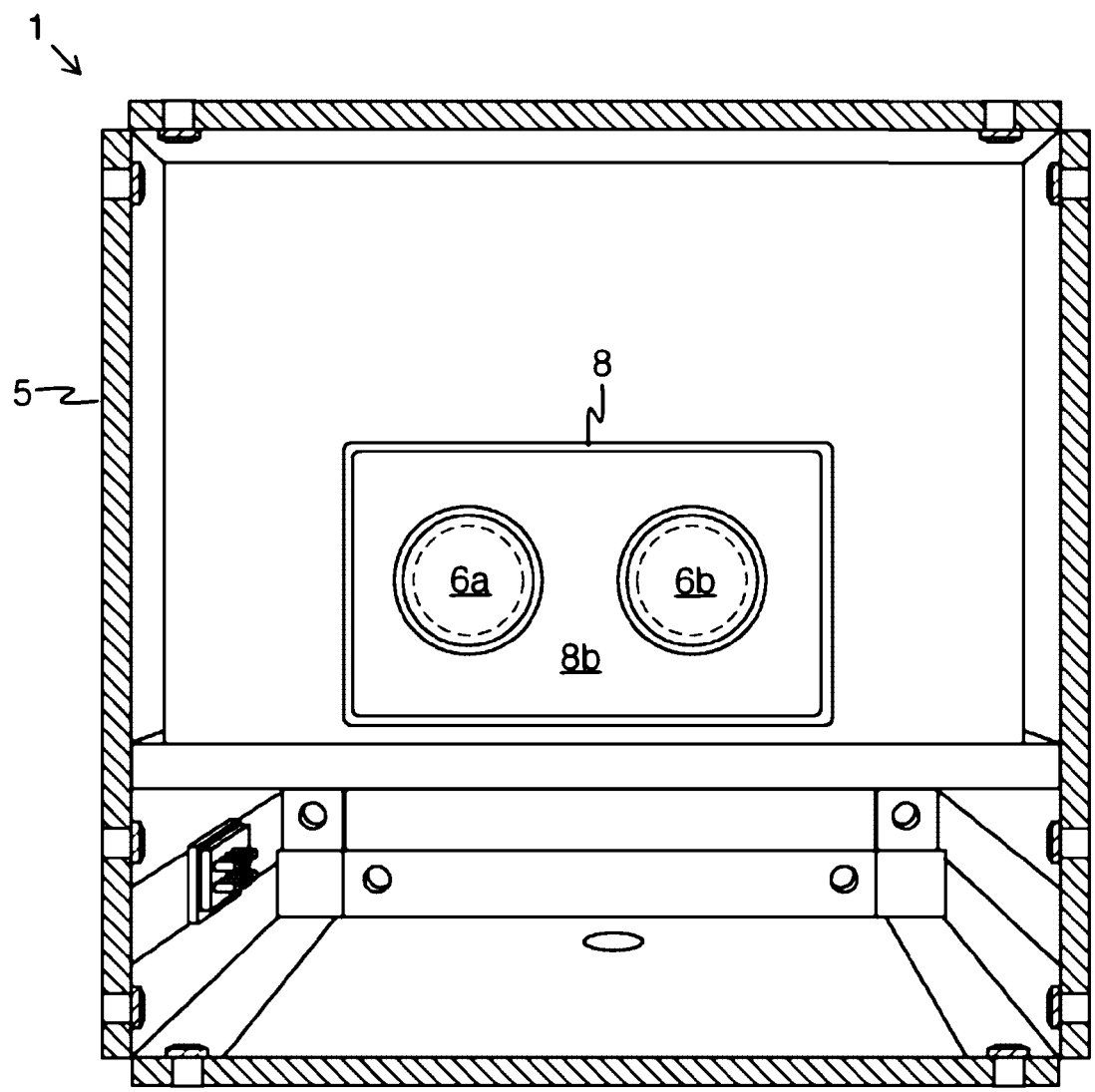
FIG. 6 a sectional view through the emulator from FIG. 3 along the VI-VI intersecting line.

FIG. 6 shows a section through the inventive emulator 1 along the VI-VI intersecting line in the Y-Z plane according to FIG. 4. The signal-absorbing chamber 8 is fully lined with the signal-absorbing material 8b except for two areas occupied by the receiver 6a and the transmitter 6b.

The receiver 6a and transmitter 6b are preferably arranged in recesses or depressions in the signal-absorbing chamber 8 around which the signal-absorbing material 8b is disposed. As a result, the surface of the receiver 6a/transmitter 6b exposed to the signal emitted by the at least one environment sensor or the response signal emitted by the transmitter 6a and which would unintentionally reflect the signal or response signal respectively can be minimized.

Figure 7B:
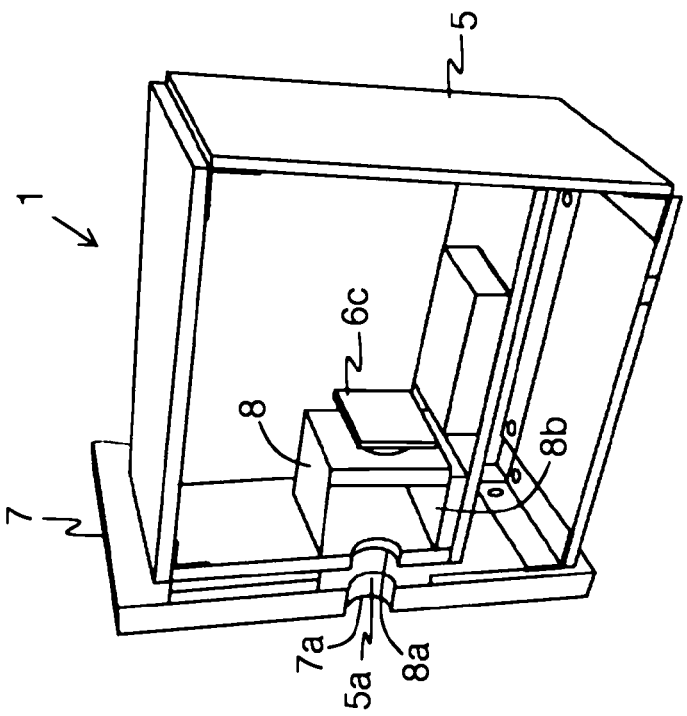
FIG. 7 a sectional view through the emulator from FIG. 3 in the X-Z plane in a three-dimensional depiction.
Figure 7A:
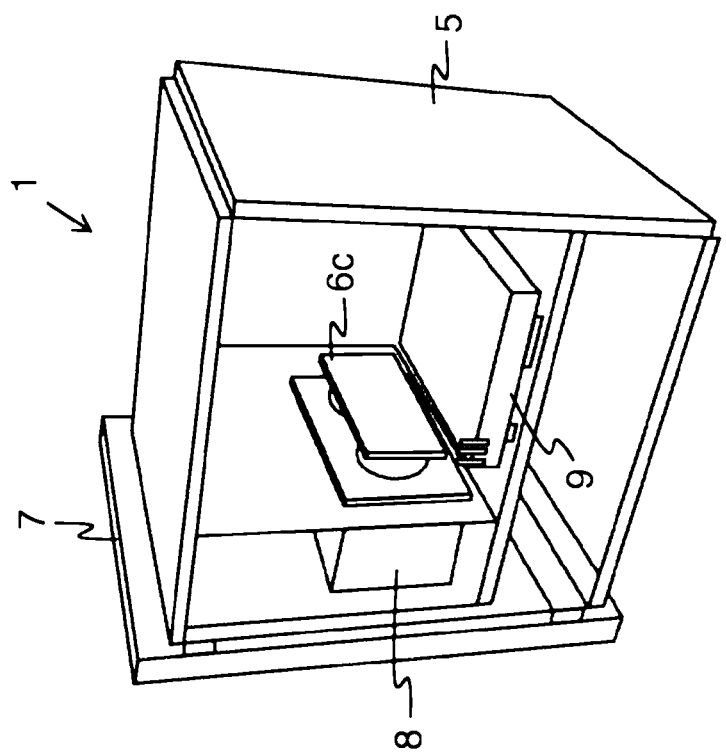

FIG. 7 shows a section through the inventive emulator 1 in the X-Z plane according to FIG. 3 in a three-dimensional depiction. In FIG. 7a, the section thereby runs past the signal-absorbing chamber 8 such that the signal processing device 9 and the transceiver board 6c are visible. In FIG. 7b, the section runs along the V-V intersecting line according to FIG. 3b), i.e. centrally through the emulator 1, such that the signal-absorbing material 8b on the interior of the signal-absorbing chamber 8 and the mutually concentric openings 5a, 7a, 8a of the housing 5, the signal-absorbing panel 7 and the signal-absorbing chamber 8 are visible.

FIG. 8 shows a preferential exemplary embodiment of an inventive system 10 for analyzing an automation system of an installation, in particular a driver assistance system of a vehicle, which comprises a plurality of emulators 1 for the at least partial virtual operation of the automation system of the installation.

Each of the emulators of the plurality of emulators 1, four of which are provided in the depicted example, has a receiver 6a and a transmitter 6b which are preferably mounted on a transceiver board 6c. The receiver 6a and the transmitter 6b can each be controlled by a signal processing device 9 via the transceiver board 6c.

Each of the signal processing devices 9 is thereby preferably configured to generate response signals on the basis of setpoint signals and/or control parameters as transmitted by the respective transmitter 6b to an environment sensor of the installation arranged on or respectively in front of the respective emulator 1 and which characterize a simulated environmental scenario. Preferentially, the generated response signals are based on signals emitted by the respective environment sensor as previously received by the respective receiver 6a.

The signal processing devices 9 are in particular designed as microcontrollers and configured to modulate and/or delay the received signals subject to the setpoint signals and/or the control parameters and to prompt the transmitters 6b to output the thusly processed signals to at least one environment sensor of the installation as response signals. The automation system of the installation can thereby be provided with information relative to the simulated environmental scenario.

A central control 11 provides the setpoint signals and/or control parameters at the signal processing devices 9. The central control 11, which is in particular designed as a microcontroller, is preferably connected to the signal processing devices 9 via a data bus, in particular an I²C bus.

The central control 11 is also connected to a simulation means 12 for simulating the environmental scenario, for instance a computing device, on which corresponding software for simulating the environmental scenario can be run, for example via a network connection. A data stream characterizing the simulated environmental scenario as thereby generated by the simulation means 12 can in particular be transmitted to the central control 11 via UDP protocol. The central control 11 is preferably configured to determine, based on the data stream as received, which response signals from the transmitters 6b of the different emulators 1 need to be sent to one or more environment sensors of the installation in order to properly depict the simulated environmental scenario for the environment sensor or the automation system connected to the environment sensor respectively. The central control 11 generates the corresponding setpoint signals and/or control parameters and provides them to the respective signal processing device 9 of the emulators 1. The central control 11 is in particular configured to coordinate the transmission of the response signals by the various transmitters 6b of the emulators 1 and thus enable the simulated environmental scenario to be properly depicted from the perspective of each environment sensor.

LIST OF REFERENCE NUMERALS 1 emulator
2 driver assistance system
3 vehicle
4 environment sensor
5 housing
5a housing opening
6a receiver
6b transmitter
6c transceiver board
7 signal-absorbing panel
7a panel opening
8 signal-absorbing chamber
8a opening
8b signal-absorbing material
9 signal processing device
9a data interface (9a)
10 system
11 central control
12 simulation means or computing device
100 method
110 test bench
111 wheel stimulation device
112 temperature control device
113 airflow emulation device
S1 method step
S2 method step
S3 method step
S4 method step
S5 method step

What is claimed is:

1. An emulator for at least partial virtual operation of an automation system of an installation having at least one environment sensor, comprising:
    a receiver configured to receive signals emitted by the at least one environment sensor;
    a signal processing device configured to generate response signals on a basis of the received signals emitted by the at least one environment sensor;
    a transmitter configured to transmit the response signals to the received signals emitted by the at least one environment sensor; and
    a signal-absorbing chamber lined with a signal-absorbing material that forms an absorptive region configured to absorb signals, wherein the receiver and the transmitter are arranged in the signal-absorbing chamber.

2. A method for analyzing an automation system of an installation having at least one environment sensor, the method comprising:
    outputting the response signals to the at least one environment sensor via the emulator in accordance with claim 1, wherein the at least one environment sensor generates sensor data on a basis of the response signals;
    via a computing device:
        simulating an environmental scenario for the installation;
        deriving the response signals to be detected by the at least one environment sensor based on the simulated environmental scenario from the perspective of the at least one environment sensor;
        operating the automation system and/or the installation using the generated sensor data; and
        simulating the at least one environment sensor by means of a sensor model,
        wherein the at least one simulated environment sensor virtually detects the simulated environmental scenario and the response signals are derived on the basis of the virtually detected simulated environmental scenario.

3. The method according to claim 2, wherein a signal for virtually detecting the simulated environmental scenario is simulated by the sensor model along with the response signals on a basis of physical models.

4. The method according to claim 2, wherein the automation system and/or the installation is/are operated on a test bench or in the field by the simulated environmental scenario.

5. The method according to claim 2, wherein when outputting the response signals, the emulator takes into account received signals emitted by the at least one environment sensor.

6. The emulator according to claim 1, wherein the signal-absorbing chamber comprises an opening through which signals emitted by the at least one environment sensor can enter the emulator and/or in which or in front of which the at least one environment sensor can be arranged.

7. A system for analyzing an automation system of an installation having environment sensors, comprising:
   a computing device capable of running software for simulating an environmental scenario for the installation; and
   the emulator in accordance with claim 1, which is configured to output a signal to the environment sensors based on the simulated environmental scenario from a perspective of the environment sensors.

8. The system according to claim 7, further comprising:
   a central control; and
   a data interface for receiving setpoints signals and/or control parameters from the central control,
   wherein the central control and the emulator are configured to communicate with one another, and wherein the central control is configured to control an output of response signals at a plurality of emulators on the basis of the simulated environmental scenario, wherein the plurality of emulators includes the emulator.

9. The system according to claim 8, wherein the central control defines a frequency, an amplitude, and a response reaction time of a signal for each emulator of the plurality of emulators.

10. A system for analyzing an automation system of an installation having at least one environment sensor, comprising:
    the emulator in accordance with claim 1, which is configured to output the response signals to the at least one environment sensor, wherein the at least one environment sensor generates sensor data on a basis of the response signals; and
    a computing device configured for:
        simulating an environmental scenario for the installation;
        deriving the response signals to be detected by the at least one environment sensor based on the simulated environmental scenario from the perspective of the at least one environment sensor;
        operating the automation system and/or the installation using the generated sensor data; and
        simulating the at least one environment sensor by a sensor model,
    wherein the at least one simulated environment sensor virtually detects the simulated environmental scenario and the response signals are derived on the basis of the virtually detected simulated environmental scenario.

* * * * *